Jan. 28, 1969  E. R. LIGON  3,424,482
PIPE COUPLING CLAMP
Filed Jan. 22, 1968
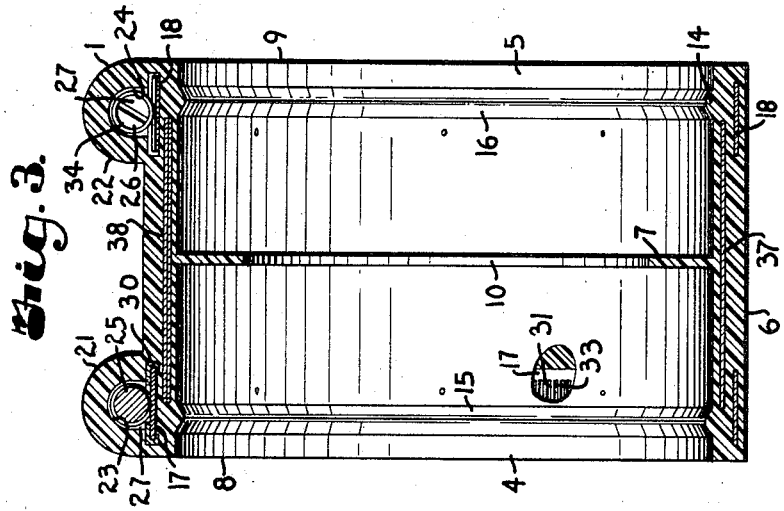
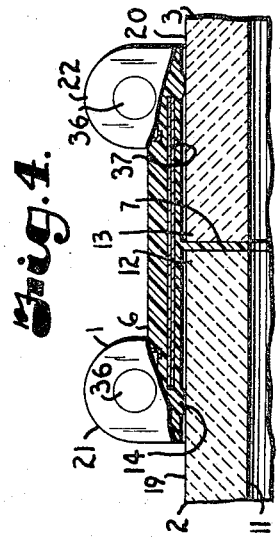
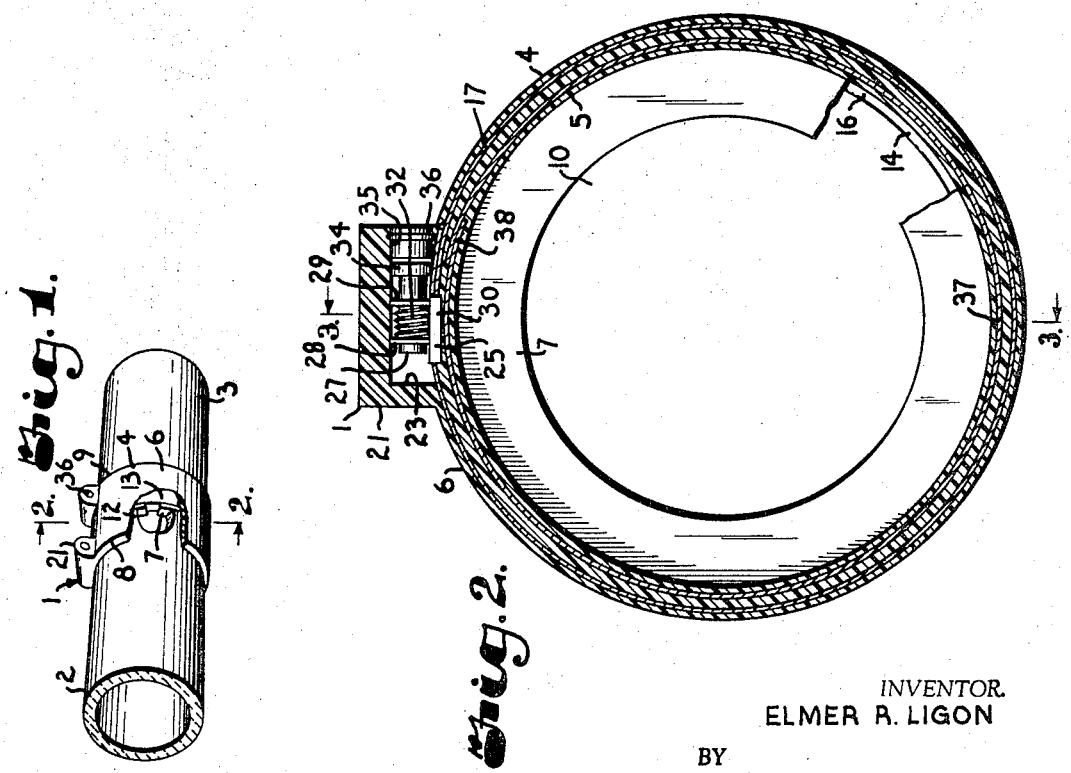
INVENTOR.
ELMER R. LIGON
BY
Fishburn, Gold & Litman
ATTORNEYS

United States Patent Office 3,424,482
Patented Jan. 28, 1969

3,424,482
PIPE COUPLING CLAMP
Elmer R. Ligon, Pittsburg, Kans., assignor to W. S. Dickey Clay Manufacturing Company, Kansas City, Mo., a corporation of Missouri
Filed Jan. 22, 1968, Ser. No. 699,586
U.S. Cl. 285—230                                    10 Claims
Int. Cl. F16l 49/00, 21/00; B65d 63/00

ABSTRACT OF THE DISCLOSURE

A coupling for connecting adjacent ends of two sections of pipe in substantially end-to-end abutment comprising an elongate sleeve formed of resilient compressible material having a centrally located inwardly directed annular flange positioned to be engaged by the adjacent pipe ends, a pair of tightening members within and surrounded by the sleeve material to tighten the sleeve portions into sealing engagement with the pipe ends, the tightening members include bands with each band being in an overlying relation to a respective pipe end, and adjusting member associated with each of said bands for reducing the circumferential lengths and tightening the sleeve about the respective pipe ends. All metal portions are enclosed and protected by the compressible material which is inert and capable of long life embedded in soil and the like and thereby particularly adapted for sewer pipes.

---

This invention relates to a pipe coupling for use with pipe having plain ends and more particularly, but not limited to plain end ceramic pipe.

The principal objects of the present invention are: to provide a pipe coupling of material inert to soil material for connecting adjacent ends of two sections of plain end pipe in substantially end-to-end abutment; to provide such a coupling formed of resilient compressible material with a pair of bands within the sleeve material for overlying relation to respective pipe ends and adjustable means associated with each band for tightening the sleeve about respective pipe ends; to provide a belt within the sleeve material and centered between opposite ends of the sleeve for support across the space between the pipe ends with all metal portions enclosed by the inert material; to provide such a coupling structure which eliminates the necessity of excavating bell holes thereby eliminating pipe failures caused by the lack of bell holes; to provide such a coupling which clampingly engages adjacent pipe ends for an infiltration free joint when used in sewer construction; and to provide such a coupling which is inexpensive to manufacture and install, durable in use, simple to install, preassembled in a complete unit ready to receive the pipe ends, and accurately installed employing tightening means applied so as to prevent cracking of the pipes or damage to the coupling.

Other objects and advantages of this invention will become apparent from the following description taken in connection with the accompanying drawings wherein are set forth by way of illustration and example certain embodiments of this invention.

FIG. 1 is a perspective view of a pipe coupling embodying features of the present invention.

FIG. 2 is a transverse sectional view through the coupling taken on line 2—2, FIG. 1.

FIG. 3 is a longitudinal sectional view through the coupling taken on line 3—3, FIG. 2.

FIG. 4 is a partial longitudinal sectional view through the coupling assembled on a joint between adjacent ends of two ceramic pipe sections.

Referring more in detail to the drawings:

The reference numeral 1 generally designates a pipe coupling structure for connecting adjacent ends of pipe sections 2 and 3 in substantially end-to-end abutment. The pipe coupling structure 1 includes a sleeve 4 of a suitable resilient compressible material having a very slight change in hardness over a wide temperature range and having dimensional stability over a wide temperature range thereby avoiding brittleness cracking. It is preferred that the material of the sleeve 4 have a low compression set without cold flow under pressure, good adhesion to the pipe sections 2 and 3 under repeated temperature cycles, excellent resistance to acids, alkalis, solvents, sewer gas, micro-organisms and root penetration, resistance to leakage from both within and outside the pipe and coupling. It is therefore preferred that the sleeve 4 of the pipe coupling structure 1 be formed of a suitable molded or cast plastic such as a urethane elastomer.

In the illustrated structure, the pipe coupling structure 1 has an elongate sleeve like member 4 that is generally cylindrical having an interior surface 5 and an exterior surface 6. It is preferred that pipe sections be separated by a resilient cushion portion and in the illustrated structure an inwardly extending annular flange 7 is centrally located between opposite ends 8 and 9 of the sleeve 4 of the pipe coupling structure 1. The annular flange 7 is adapted to be engaged by ends 12 and 13 of the pipe sections 2 and 3 respectively, thereby providing a cushioned separation between said pipe ends and preventing pipe-to-pipe contact. The sleeve 4 has seal portions 14 for engaging the pipe sections to prevent leakage. In the structure illustrated the sleeve 4 has annular ribs 15 and 16 which extend inwardly from the interior surface 5 and are positioned to engage the pipe sections of the joints near the ends 8 and 9.

A pair of annular bands 17 and 18 each having overlapping ends are positioned within the sleeve material.

The bands 17 and 18 are spaced apart longitudinally of the pipe sections and are in an overlying relation to adjacent end portions 19 and 20 of the pipe sections 2 and 3 respectively.

The sleeve 4 has outstanding ears or housings 21 and 22 which overlie a portion of the respective bands 17 and 18. The ears or housings 21 and 22 have interior chambers 23 and 24 in which are located adjusting members 25 and 26 respectively for the respective bands 17 and 18 which are operative to effect clamping engagement of the sleeve 4 with the pipe end portions 19 and 20 and sealing engagement between the ribs 15 and 16 and the pipe sections 2 and 3 respectively.

In the illustrated structure, the adjusting members 25 and 26 each consist of a suitable fastening device, such as a screw 27, mounted in a suitable support, such as a housing having ends on ears 28 and 29 extending upwardly from opposite ends of a base member 30. One end of each band 17 or 18 is secured to its respective base member 30, the other band end being threaded through suitable aligned openings in the ears 28 and 29 in overlying relation with said one end. The bands 17 and 18 each have a plurality of circumferentially spaced slots 31 and threads 32 of the respective screw 27 extend into certain slots 31 and engage abutments 33 between the slots 31. Rotating a screw 27 moves the other band end relative to said one end and changes the internal diameter of the respective band 17 or 18 thereby either tightening or loosening same relative to the respective pipe section 2 or 3.

A head portion 34 of the screw 27 is aligned with a bore 35 opening at an end of the respective ear or housing 21 or 22 providing access for rotation of the screw. After the respective band 17 or 18 is adjusted to provide clamping engagement between the respective rib 15 or 16 and the exterior surface of the respective pipe section 2 or 3 a suitable closure member, such as a plug 36 is installed in the bore 35 and sealed to provide a fluid tight seal to the respective chamber 23 or 24.

A belt 37 preferably of metal is positioned within the sleeve material and radially inwardly of the bands 17 and 18. The belt is substantially rigid longitudinally of the sleeve to retain its shape and is of a width that side portions underlie the bands 17 and 18. The belt 37 has overlapping ends 38 whereby tightening the bands 17 and 18 changes the diameter of the belt 37 through relative movement of the overlapping ends 38. The belt 37 preferably is centered between the ends 8 and 9 of the sleeve 4 of the pipe coupling structure 1 and centered in an overlying relation to the annular flange 7 thereby providing reinforcing to the sleeve 4 of the pipe coupling structure 1 for the space between ends 12 and 13 of the pipe sections 2 and 3.

In the illustrated structure the surface formed by the edge of the annular ribs 15 and 16 has an internal diameter slightly less than the diameter of the exterior surface of the respective pipe sections 2 and 3 whereby the sleeve 4 has a relatively tight fit on the respective pipe sections 2 and 3. The interior diameter of sleeve 4 is greater than the diameter of the exterior surface of the ends 12 and 13 of the pipe sections 2 and 3 respectively thereby providing a fluid tight pipe coupling structure and assuring a flexible seal that remains tight even when there is relative movement between the pipe sections 2 and 3 due to line deflection during trench back filling or trench settling or the like. An annular space or chamber 39 is thereby formed between the exterior surface of the pipe sections 2 and 3 and the interior surface 5 with each space being bounded by the annular flange 7 and the respective ribs 15 or 16. Each space 39 provides a deflection clearance area which allows the ends 12 or 13 to move relative to each other with the respective rib 15 or 16 being a fulcrum when line deflection occurs.

In making a coupling such as illustrated and described a mold having a cavity conforming to the shape of the extension of the plastic portion is made with provision for introducing the plastic such as a urethane elastomer therein. A plurality of support pins are arranged to extend into the cavity to cooperate to support the bands 17 and 18 and belt 37 in the desired positions spaced from the cavity surfaces.

It is preferable that the bands 17 and 18 and the belt 37 be of metal, such as steel, with the metal parts suitably coated to prevent bond with the plastic during forming the sleeve 4 and setting of the material for the sleeve 4.

When the bands and belt are positioned the mold parts are closed and the plastic poured or otherwise introduced into the cavity to fill same and allowed to cure or harden to a self supporting condition. The mold is then opened and the coupling removed. The holes for the plastic part formed by the pins are filled with a suitable material, such as the same material as the sleeve 4, and welded or adhered thereto to close and seal same to prevent entry of moisture to the bands 17 and 18 and the belt 37.

Installation of the pipe coupling structure 1 on the pipe sections 2 and 3 is extremely fast and simple requiring only cleaning of the pipe ends 12 and 13 and the interior surface 5, application of a suitable lubricant to the interior surface 5 and to the respective ribs 15 and 16, inserting the sleeve 4 on one of the ends, as for example end 12, until the respective end seats against the annular flange 7 and then inserting the other end into seating engagement with the annular flange 7. The screws 27 are then rotated to tighten the bands 17 and 18 to clamp the sleeve on the pipe end and enhance the seal. The plugs 36 are inserted and sealed in place. With this completed the pipe ends are coupled and only the plastic is exposed to the action of the earth elements and the like. All metal parts of the coupling are sealed in the sleeve.

It is to be understood that while I have illustrated and described one form of our invention, it is not to be limited to these specific forms or arrangement of parts herein described and shown except insofar as such limitations are included in the claims.

What I claim and desire to secure by Letters Patent is:

1. A coupling for connecting adjacent ends of two sections of pipe in end-to-end abutment comprising:
    (a) an elongate sleeve formed of resilient compressible material;
    (b) a pair of bands enclosed within and said surrounded by said sleeve material, said bands being spaced apart longitudinally of the pipe sections with each band being in an overlying relation to respective pipe ends being connected; and
    (c) adjusting means associated with each of said bands and enclosed within and surrounded by said sleeve material for tightening said sleeve about respective pipe ends.

2. The coupling for connecting adjacent pipe ends as set forth in claim 1 including:
    (a) a pair of outstanding housings on said sleeve and each having an interior chamber in an overlying relation to said respective bands, said housings each having a bore communicating with said chamber, said bores being in a transverse relation with said sleeve;
    (b) the band adjusting means being in each of said respective chambers and aligned with said respective bore whereby operation of said adjusting means is operative to tighten the respective band and said sleeve about said respective pipe ends, and
    (c) closure means for closing said bores after said sleeve is tightened about said respective pipe ends.

3. The coupling for connecting adjacent pipe ends as set forth in claim 2 including:
    (a) said closure means being an elongate plug secured in each of said housing bores.

4. The coupling for connecting adjacent pipe ends as set forth in claim 2 including:
    (a) each of said bands having a plurality of circumferentially spaced abutments, and
    (b) each of said adjusting means having a screw thread engaging said abutments.

5. The coupling for connecting adjacent pipe ends as set forth in claim 2 including:
    (a) a belt within said sleeve material,
    (b) said belt being positioned between said pair of bands and an interior surface of said sleeve, and
    (c) said belt having overlapping ends whereby said belt is adjustable in response to adjustment of said band adjusting means.

6. The coupling for connecting adjacent pipe ends as set forth in claim 5 wherein:
    (a) said belt is centered between opposite ends of said sleeve, and
    (b) said bands are each in an overlying relation to a portion of said belt.

7. The coupling for connecting adjacent pipe ends as set forth in claim 6 including:
    (a) said bands and said belt being separated by said resilient compressible material, and
    (b) said chambers being in an overlying relation to a portion of said overlapping ends of said belt.

8. The coupling for connecting adjacent pipe ends as set forth in claim 7 including:
    (a) annular ribs extending inwardly from an interior surface of said sleeve adjacent opposite ends of said sleeve, and
    (b) said ribs have an internal diameter slightly less than said respective ribs whereby operation of said respective adjusting means is operative to tighten said respective ribs in clamping engagement with said respective pipe ends.

9. The coupling for connecting adjacent pipe ends as set forth in claim 8 wherein:
    (a) said sleeve has an internal diameter greater than an external diameter of said pipe ends being connected, and
(b) said ribs have an internal diameter slightly less than an external diameter of said pipe ends whereby said ribs sealingly engage said respective pipe ends.

10. The coupling for connecting adjacent pipe ends as set forth in claim 9 including:
(a) a centrally located inwardly extending annular flange positioned for engaging and separating respective pipe ends being connected, and
(b) elongate annular deflection chambers between said sleeve interior surface and an exterior surface of said respective pipe ends being connected with each chamber extending from said annular flange to said respective rib and permitting movement of the pipe ends within said respective chamber.

References Cited

UNITED STATES PATENTS

| | | | |
|---|---|---|---|
| 2,872,141 | 2/1959 | Hefner | 138—99 X |
| 3,043,612 | 7/1962 | Paulik et al. | 285—236 X |
| 3,233,922 | 2/1966 | Evans | 285—236 |
| 3,365,218 | 1/1968 | Denyes | 285—236 X |
| 3,268,654 | 8/1966 | Morrison et al. | 285—236 X |

FOREIGN PATENTS 776,837  6/1957  Great Britain.

THOMAS F. CALLAGHAN, *Primary Examiner.*

U.S. Cl. X.R.

24—274; 285—236